United States Patent [19]

Luse

[11] 3,738,517
[45] June 12, 1973

[54] PICKUP CAMPER LOADING ARRANGEMENT

[76] Inventor: Joe R. Luse, 107 E. Washington St., Centerville, Iowa

[22] Filed: Mar. 27, 1972

[21] Appl. No.: 238,294

[52] U.S. Cl. ............................................. 214/515
[51] Int. Cl. ............................................. B60p 1/64
[58] Field of Search ................ 214/515; 254/49, 254/50, 46

[56] References Cited
UNITED STATES PATENTS

| | | | |
|---|---|---|---|
| 3,074,576 | 1/1963 | Peterson | 214/515 |
| 3,251,494 | 5/1966 | Pullian | 214/515 |
| 3,409,154 | 11/1968 | Rasmussen | 214/515 |

Primary Examiner—Gerald M. Forlenza
Assistant Examiner—R. B. Johnson
Attorney—Daniel Jay Tick

[57] ABSTRACT

Push rod mounting means on the sides of a camper near the front thereof mount a pair of push rods for loading the camper in a truck and push rod mounting means on the sides of the camper near the back thereof mount the push rods for unloading the camper from the truck. The push rods provide a force at the camper contrary to the direction of movement of the truck in loading and unloading. Fixed back support members at the bottom of the camper at the back thereof support the camper at a determined distance above the ground. A movably mounted front bracing member at the bottom of the camper is biased to extend at an angle slightly less than 90° from the camper when free and held at substantially 0° relative to the camper when the camper is loaded on the truck. Guide means on the truck guide the camper relative to the truck in a manner whereby when the push rods are mounted on the push rod mounting means at the back of the camper at an acute angle with the length of the camper in the direction of the front thereof and the truck is moved forward, the camper unloads from the truck, and when the push rods are mounted on the push rod mounting means at the front of the camper at an acute angle with the length of the camper in the direction of the back thereof and the truck is moved backward under the front of the camper, the camper is loaded on the truck.

4 Claims, 13 Drawing Figures

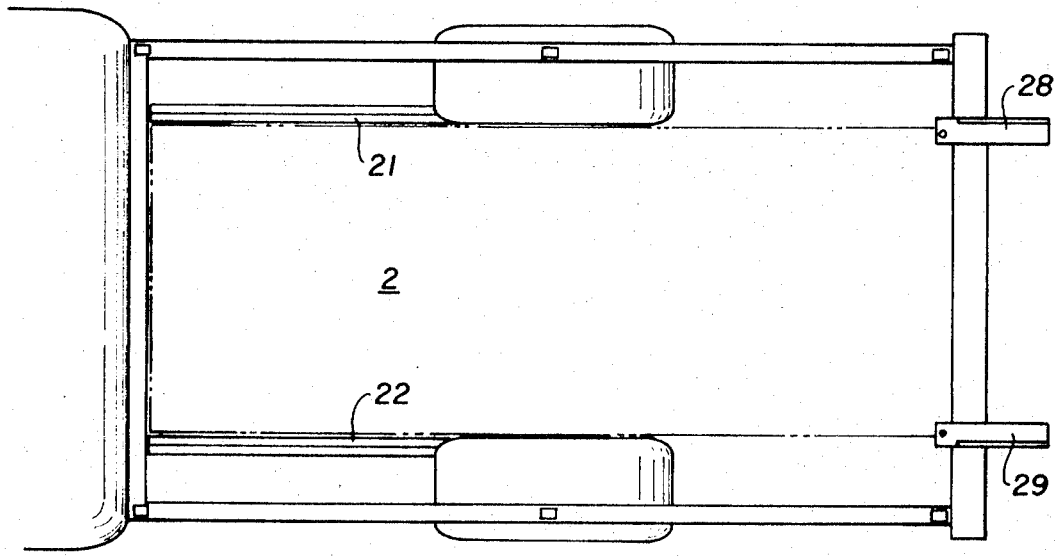
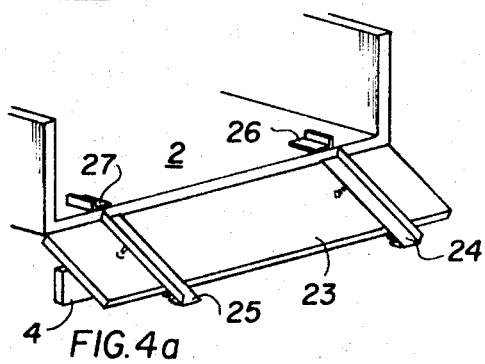
FIG.2
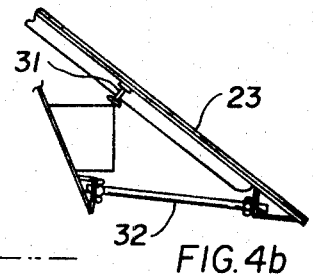
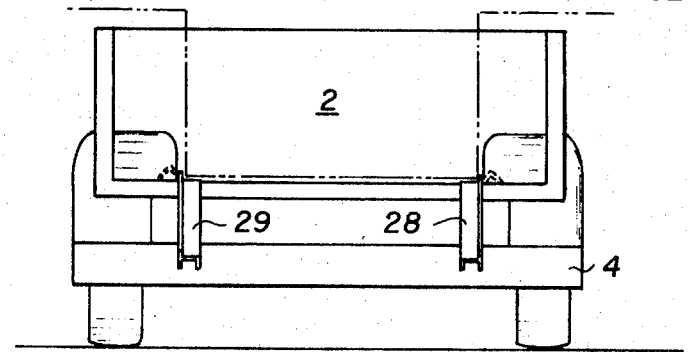
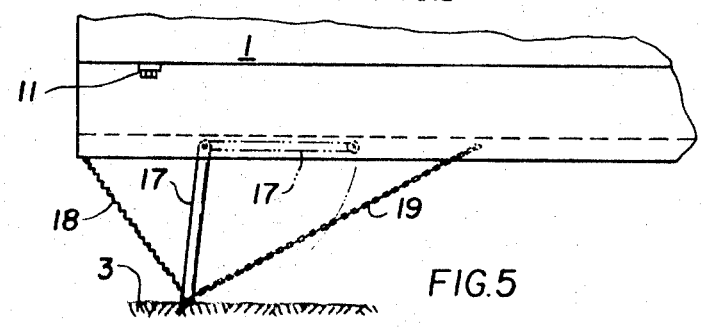

PICKUP CAMPER LOADING ARRANGEMENT

DESCRIPTION OF THE INVENTION

The present invention relates to a pickup camper loading arrangement.

The principal object of the invention is to provide a pickup camper loading arrangement of simple structure for loading a camper on a pickup truck and for unloading the camper from the truck to the ground with facility, ease and rapidity.

An object of the invention is to provide a pickup camper loading arrangement for loading a camper on a pickup truck and for unloading the camper from the truck to the ground with efficiency, effectiveness and reliability.

In order that the invention may be readily carried into effect, it will now be described with reference to the accompanying drawings, wherein:

FIGS. 4e and 1f are schematic diagrams of the pickup camper loading arrangement of FIGS. 1a, 1b, 1c and 1d illustrating the loading of a camper on a pickup truck;

FIG. 2 is a top view of a pickup truck utilizing the pickup camper loading arrangement of the invention;

FIG. 3 is a rear view of the pickup truck of FIG. 2;

FIG. 4a is a perspective view of the rear end of the pickup truck of FIGS. 2 and 3;

FIG. 4b is a side view of the flap reinforcing means of the invention;

FIG. 5 is a schematic diagram of part of a camper illustrating the front bracing member;

In the figs., the same components are identified by the same reference numerals.

Figure 1A:
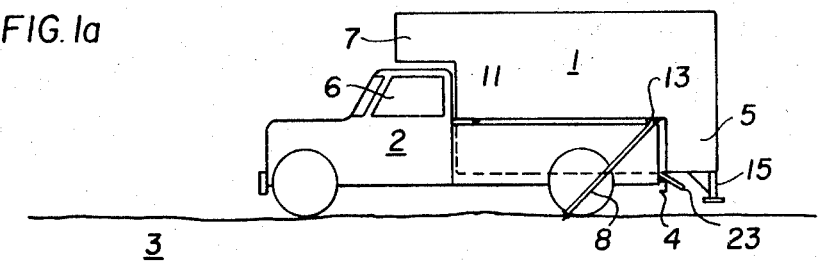
FIGS. 1a, 1b, 1c and 1d are schematic diagrams of an embodiment of the pickup camper loading arrangement of the invention illustrating the unloading of a camper from a pickup truck to the ground.
Figure 1B:
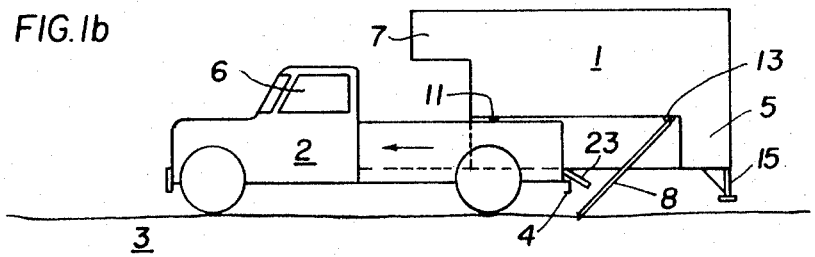
Figure 1C:
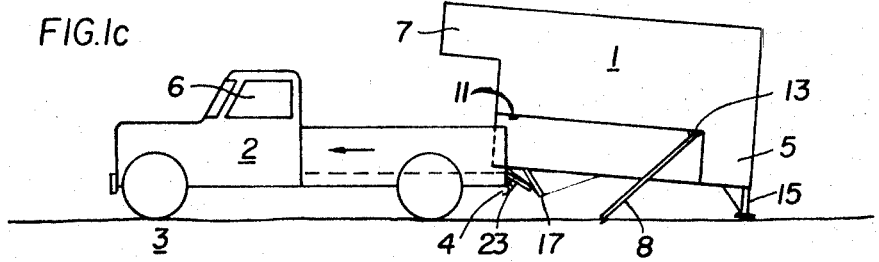
Figure 1D:
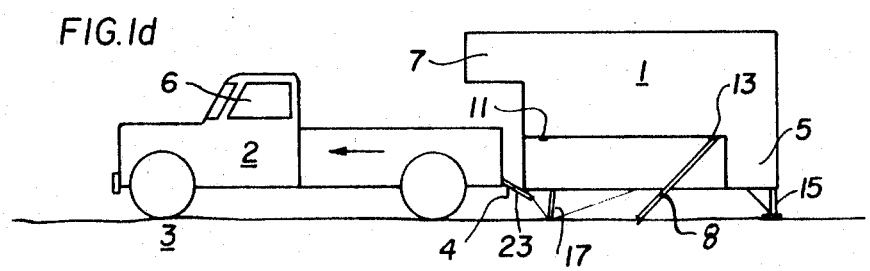
Figure 1E:
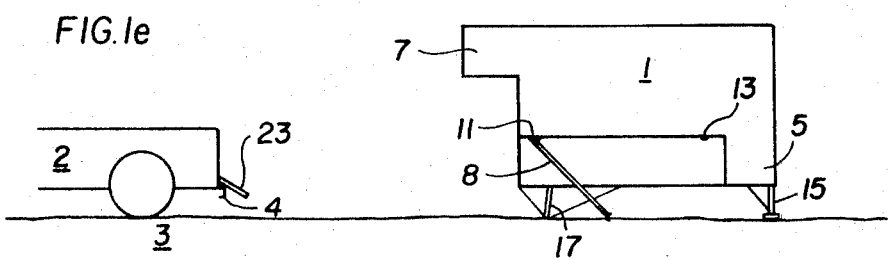
Figure 1F:
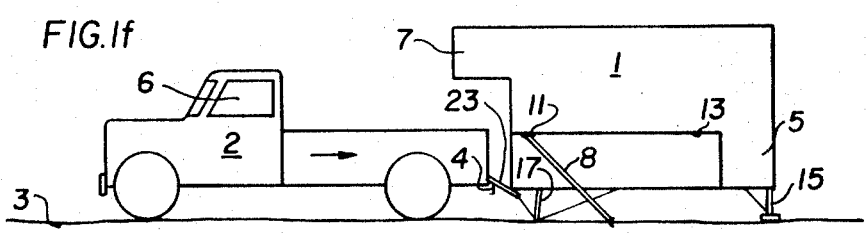

The pickup camper loading arrangement of the invention loads a camper 1 on a pickup truck 2 and unloads said camper from said truck to the ground 3 (FIGS. 1a to 1f and 6). The truck 2 has a rear bumper 4 in the area of the back 5 of the camper 1 and a cab 6 in the area of the front 7 of said camper (FIGS. 1a and 1f).

Figure 6:
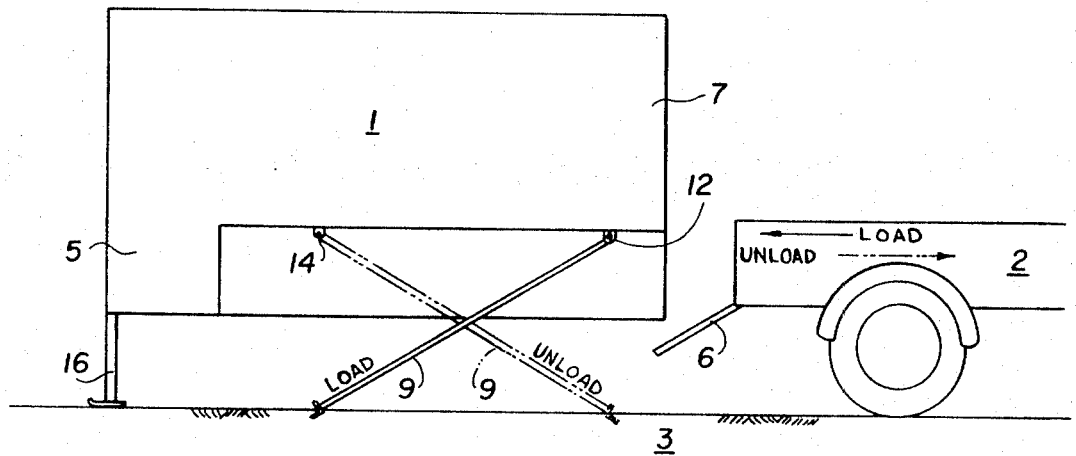
FIG. 6 is a schematic diagram of the embodiment of the pickup camper loading arrangement of FIGS. 1a to 1f at rest on the ground illustrating the positions of the push rods for loading and unloading.
Figure 7:
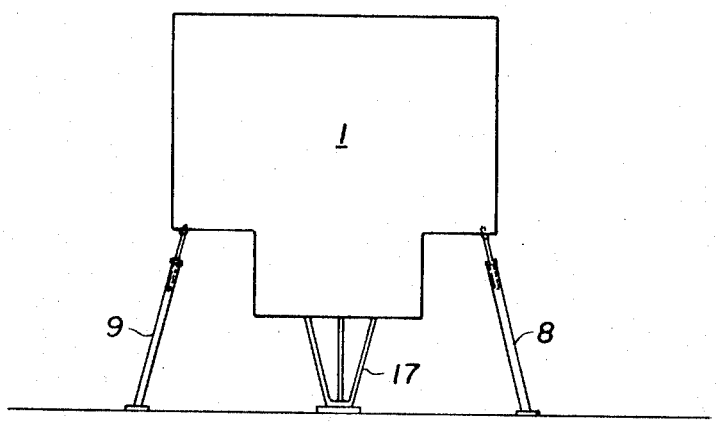
FIG. 7 is a schematic diagram of the pickup camper of FIG. 6 at rest on the ground illustrating the positions of the front bracing member and of the push rods.

The pickup camper loading arrangement of the invention comprises a pair of push rods 8 and 9, of which only one is shown in FIGS. 1e to 1f and 6 and both are shown in FIG. 7. The push rods 8 and 9 provide a force at the camper 1 contrary to the direction of movement of the truck in loading and unloading.

Push rod mounting means 11 and 12 are provided on the sides of the camper 1 near the front 7 thereof for mounting the push rods 8 and 9 for loading the camper on the truck 2. Push rod mounting means 13 and 14 are provided on the sides of the camper near the back 5 thereof for mounting the push rods 8 and 9 for unloading of the camper 1 from the truck 2. The push rod mount 11 is shown in FIGS. 1a to 1f and 5, the push rod mount 12 is shown in FIG. 6, the push rod mount 13 is shown in FIGS. 1a to 1f, and the push rod mount 14 is shown in FIG. 6.

Fixed back support members 15 and 16 are mounted at the bottom of the camper 1 at the back 5 thereof for supporting said camper at a determined distance above the ground 3. The back support member 15 is shown in FIGS. 1a to 1f and the back support member 16 is shown in FIG. 6.

A movably mounted front bracing member 17 (FIGS. 1c, 1d, 1e, 1f, 5 and 7) is mounted at the bottom of the camper and is biased to extend at an angle slightly less 90° from the camper when free. The front bracing member 17 is held at substantially 0° relative to the camper 1 when the camper is loaded on the truck 2.

The front bracing member 17 may be biased in any suitable manner such as, for example, a spring 18 affixed to the camper 1 and to the front bracing member (FIG. 5), which urges said front bracing member upward toward the camper 1. A chain 19 may then be affixed to the front bracing member 17 and to the camper 1 for preventing said front bracing member from moving to other than an angle slightly less than 90° from the camper under the force of the spring 18. When the camper 1 is loaded on the truck 2, the front bracing member 17 is held at substantially 0° relative to said camper as shown by broken lines in FIG. 5.

Guide tracks 21 and 22 are provided on the truck 2 (FIG. 2) for guiding the camper 1 relative to the truck 2. The truck 2 has a back flap 23 (FIGS. 1a to 1f, 4a, 4b and 6). Guide tracks 24 and 15 (FIG. 4a) are provided on the flap 23 of the truck 2 and additional guide tracks 26 and 27 (FIG. 4a) may be provided on the truck. If the truck 2 has no back flap, guide tracks 28 and 29 (FIGS. 2 and 3) may be provided instead of the guide tracks 24 and 25 which are mounted on said back flap.

The back flap 23 may be reinforced by the reinforcing device shown in FIG. 4b for strengthening the weight-carrying capacity of said back flap. The reinforcing device of FIG. 4b includes a support member 31 which rests on the rear bumper 4 of the truck 2 and an adjustable structural member 32.

When the push rods 8 and 9 are mounted on the push rod mounts 13 and 14 at the back of the camper 1 at an acute angle with the length of the camper in the direction of the front thereof and the truck is moved forward, the camper unloads from the truck, as shown in FIGS. 1a, 1b, 1c, 1d and 6. When the push rods 8 and 9 are mounted on the push rod mounted 11 and 12 at the front of the camper 1 at an acute angle with the length of the camper in the direction of the back thereof and the truck is moved backward under the front 7 of the camper, the camper is loaded on the truck 2, as shown in FIGS. 1e, 1f and 6.

The push rods 8 and 9 are manually removably affixed to the desired push rod mounts 11 and 12 or 13 and 14 in accordance with whether the user wishes to load or unload.

While the invention has been described by means of specific examples and in specific embodiments, I do not wish to be limited thereto, for obvious modifications will occur to those skilled in the art without departing from the spirit and scope of the invention.

I claim:

1. Pickup camper loading arrangement for loading a camper on a pickup truck and for unloading the camper from the truck to the ground, the truck having a rear bumper in the area of the back of the camper and a cab in the area of the front of the camper, said pickup camper loading arrangement comprising
- a pair of push rods for providing a force at the camper contrary to the direction of movement of the truck in loading and unloading;
- push rod mounting means on the sides of the camper near the front thereof for mounting the push rods for loading of the camper on the truck and on the sides of the camper near the back thereof for mounting the push rods for unloading of the camper from the truck;
- fixed back support members at the bottom of the camper at the back thereof for supporting the camper at a determined distance above the ground;
- a movably mounted front bracing member at the bottom of the camper biased to extend at an angle slightly less than 90° from the camper when free and held at substantially 0° relative to the camper when the camper is loaded on the truck; and
- guide means on the truck for guiding the camper relative to the truck in a manner whereby when the push rods are mounted on the push rod mounting means at the back of the camper at an acute angle with the length of the camper in the direction of the front thereof and the truck is moved forward the camper unloads from the truck and when the push rods are mounted on the push rod mounting means at the front of the camper at an acute angle with the length of the camper in the direction of the back thereof and the truck is moved backward under the front of the camper the camper is loaded on the truck.

2. A pickup camper loading arrangement as claimed in claim 1, wherein the guide means comprise tracks.

3. A pickup camper loading arrangement as claimed in claim 1, wherein the truck has a back flap and the guide means comprises tracks on the truck bed and on the back flap thereof.

4. A pickup camper loading arrangement as claimed in claim 3, further comrpising flap reinforcing means for strengthening the weight-carrying capacity of the back flap of the truck.

* * * * *